United States Patent [19]

Chua

[11] Patent Number: 5,142,854
[45] Date of Patent: Sep. 1, 1992

[54] FRUIT HARVESTING DEVICE

[76] Inventor: Jose A. Chua, 3629 Ponderosa Trail, Pinole, Calif. 94564

[21] Appl. No.: 678,739

[22] Filed: Apr. 1, 1991

[51] Int. Cl.$^5$ ...................... A01D 46/22; A01D 46/24
[52] U.S. Cl. ........................................ 56/335; 56/336
[58] Field of Search ................. 56/335, 336, 332, 337, 56/338, 339, 239

[56] References Cited

U.S. PATENT DOCUMENTS

| 97,275 | 11/1869 | Cogswell | 56/335 |
|---|---|---|---|
| 498,620 | 5/1893 | Chambers | 56/335 |
| 590,923 | 9/1897 | Wald | 56/336 |
| 679,320 | 7/1901 | Kruse | 56/335 |
| 853,313 | 5/1907 | Myers | 56/336 |
| 999,261 | 8/1911 | Richardson et al. | 56/336 |
| 1,247,878 | 11/1917 | Raney | 56/336 |
| 4,928,461 | 5/1990 | King | 56/332 X |

FOREIGN PATENT DOCUMENTS 101331  11/1897  Fed. Rep. of Germany ........ 56/336

Primary Examiner—Stephen J. Novosad
Attorney, Agent, or Firm—Bielen, Peterson & Lampe

[57] ABSTRACT

A device for harvesting fruit for biological entities such as a tree or bush utilizing a frame member. The frame member includes a first cutting edge portion and a second cutting edge portion which is linked to the frame member. The first and second cutting edge portions are positioned adjacent one another and form a converging channel which is capable of severing attachment of the fruit attached to the tree. Handle means is also included for permitting the user to grip the frame member and capture fruit in the channel portion formed by the first and second cutting edges.

11 Claims, 2 Drawing Sheets

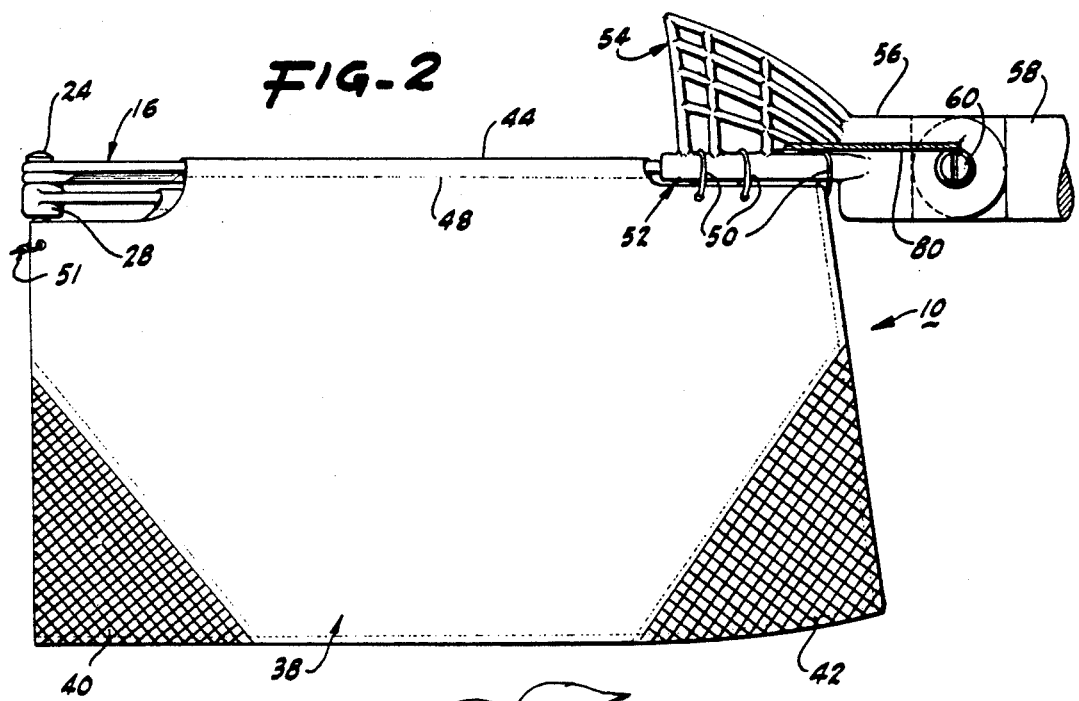
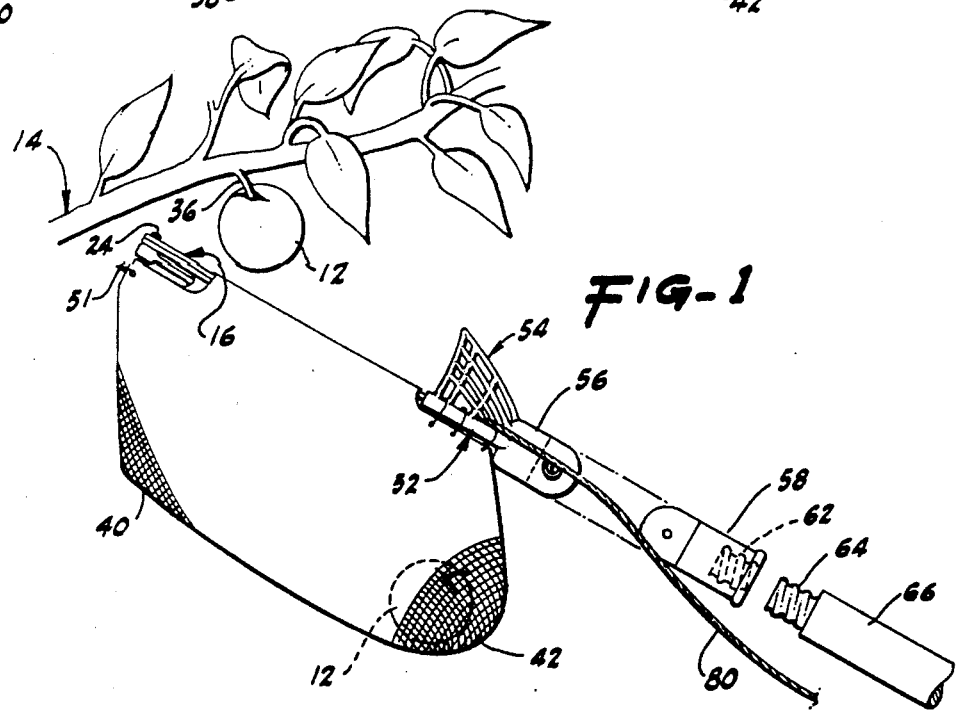

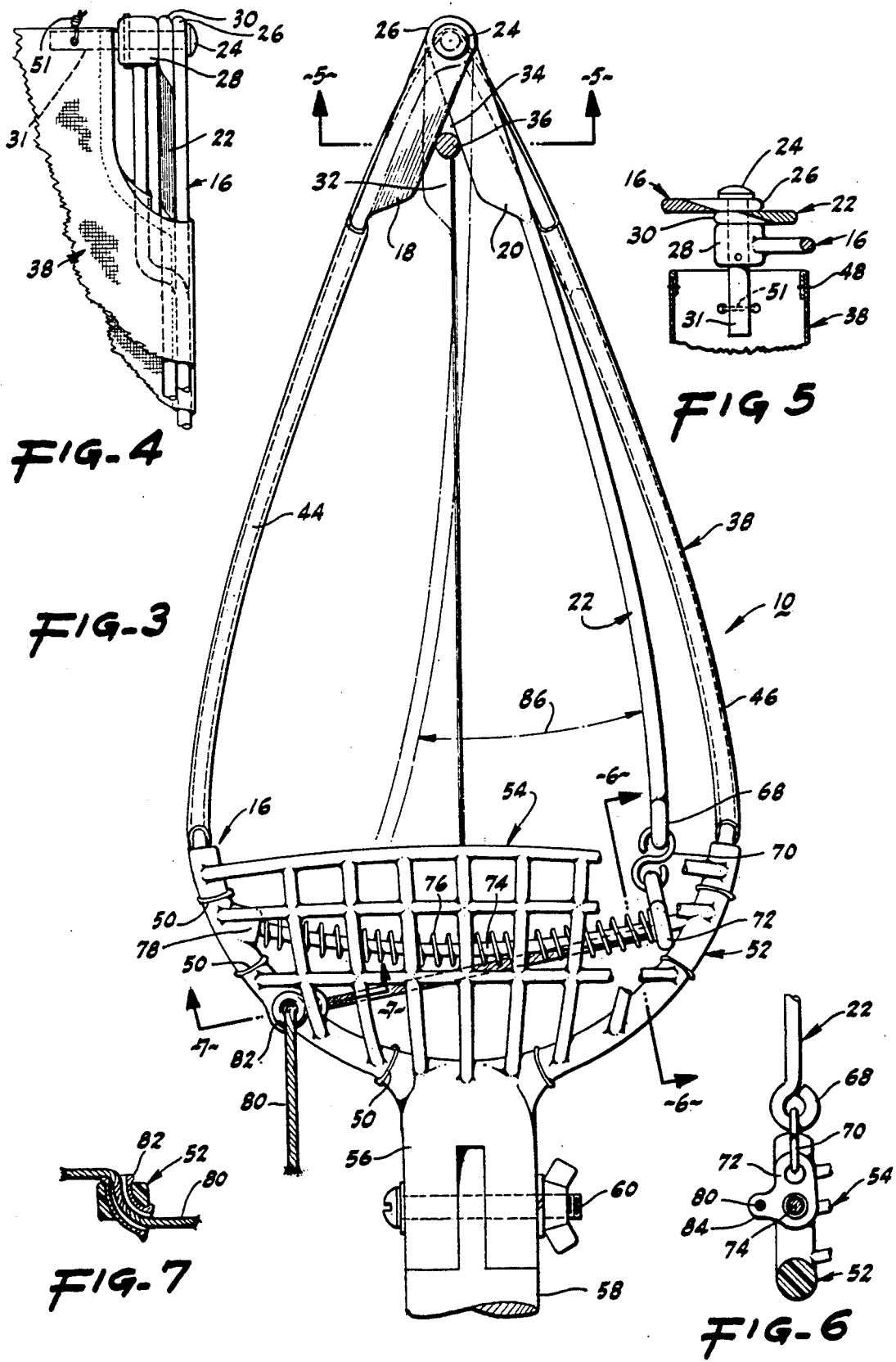

FRUIT HARVESTING DEVICE

CROSS-REFERENCE

Disclosure document 255951 was filed on Jun. 21, 1990 in the United States Patent and Trademark Office.

BACKGROUND OF THE INVENTION

The present invention relates to a novel and useful device for harvesting fruit attached to a biological entity.

Fruits and vegetables usually grow on shrubs and trees and require harvesting or picking at the proper time to maximize commercial distribution and to minimize spoilage. Harvesting is an age old problem which normally requires intense manual work within a short period of time. Unlike harvesting of crops such as wheat, barley, corn, and the like, the harvesting of fruits and vegetables on bushes and trees has not been greatly mechanized.

To aid the manual harvesting of fruits, prior art devices have included wire baskets which tend to become entangled in the tree branches. Other devices have included cutting shears found at the heel of a basket which extends into a gripping pole. The manipulation of such a device is difficult to accomplish within the confines of a tree.

A harvesting device which overcomes the difficulties and problems found in the prior art would be a great advance in fruit processing industry.

SUMMARY OF THE INVENTION

In accordance with the present invention a novel and useful device for harvesting fruit attached to a biological entity is herein provided.

The device of the present invention utilizes a frame member which includes a first cutting edge portion. The frame member may be formed into a closed loop of elongated material such as metal tubing. Such loop may take the planar configuration of a tear drop such that the first cutting edge portion lies at the narrow position along such tear drop. A second cutting portion is linked to the frame member and positioned adjacent the first cutting edge portion to form a converging channel. Such channel formed by the first and second cutting edges is capable of severing attachment of the biological entity such as a tree. The first cutting portion may also include a recess along the cutting edge which further aids in the severing process.

The second cutting edge linked to frame member may include the provision of elongated member which is rotatably fastened to the frame member. Thus, the elongated member and the second cutting edge may be moved toward the first cutting edge in order to sever fruit from trees. Guide means may also be included for controlling the rotation of the rotating member. Such guide means may take the form of a rod and an encompassing or ring connected to the elongated member which at leas partially surrounds the rod. The rod may be connected to the frame member. Spring means may also be found in the present invention for urging the second cutting edge away from the first cutting edge. Such spring means may also be held by the rod and bear upon the rod encompassing portion of the elongated member.

A line or a lead may be found in the present invention for connection to the elongated member. Means is also envisioned in the present invention for directing such line through the vicinity of a handle which is fastened to the frame member. Such handle permits the user to grip frame member. It should be noted that the handle means is positioned at the frame member opposite to the position of the channel formed by the first and second cutting edges such positioning may be at various angles between the handle and frame member. In this manner, the user severs fruit from a tree by pulling the frame member after engaging the stem portion of the fruit within the channel formed by the first and second cutting edges. A bag or basket is connected to the frame member to capture the fruit severed from the tree. Thus, the frame member forms a mouth of such a bag. A flange may extend from the frame opposite to the bag as a barrier against fruit escaping capture by the bag of the harvester of the present invention, since escaping fruit may be damaged or cause injury to persons.

It may be apparent that a novel and useful device for harvesting fruit has been described.

It is therefore an object of the present invention to provide a device for harvesting fruits and vegetable of various sizes and shapes which permits the user to easily sever the fruit from the biological entity by a pulling motion.

It is another object of the present invention to provide a device for harvesting fruit attached to a biological entity which does not easily entangle within the branches of the shrub or tree holding the fruit.

Another object of the present invention is to provide a device for harvesting fruit from a biological entity which includes an easily manipulated scissor device which may be used to urge a pair of cutting edges toward one another.

Another object of the present invention is to provide a device for harvesting fruit which easily severs rigid stem fruit without damaging the tree, Another object of the present invention is to provide a device for harvesting fruit which permits selective picking of inaccessible and clustered fruit.

The invention possesses other objects and advantages especially as concerns particular characteristics and features thereof which will become apparent as the specification continues.

BRIEF DESCRIPTION OF THE DRAWINGS

FIG. 1 is a side elevation view of the device with an exploded handle portion depicted in the environment of use.

FIG. 2 is a side elevational view of the device of the present invention.

FIG. 3 is a top plan view of the device of the present invention the movable second cutting edge portion shown in two positions.

FIG. 4 is a side elevational view of the narrow channel portion of the frame member of the device of the present invention.

FIG. 5 is a sectional view taken along line 5—5 of FIG. 3.

FIG. 6 is a sectional view taken along line 6—6 of FIG. 3.

FIG. 7 is a sectional view taken along line 7—7 of FIG. 3.

For a better understanding of the invention reference is made to the following detailed description of the preferred embodiments thereof which should be taken in conjunction with the hereinabove described drawings.

BRIEF DESCRIPTION OF THE PREFERRED EMBODIMENTS

Various aspects of the present invention will evolve from the following detailed description of the preferred embodiments which should be compared with the heretofore described drawing.

The invention as a whole is depicted in the drawing by reference character 10. The harvesting device 10 is employed to harvest fruit such as apple 12 from a biological entity such as a apple tree 14, FIG. 1. Device 10 includes as one of its elements a frame member 16 which is shown in the drawings as being roughly teardrop shaped. Frame member 16 includes a first cutting edge portion which is integrally formed with a member 16. A second cutting edge portion 20 is found at the terminus 30 of elongated member 22. A pin 24, FIG. 5 holds the ring end 26 of frame member 16 and terminus 30 of elongated member 22. Bushing 28 of frame member 16 also surrounds the shank 31 of pin 24 and is positioned adjacent terminus 30.

First and second cutting edge portions 18 and 20, respectively, form a channel 32 which converges to a narrow portion 34, FIG. 3. A stem 36 on a fruit, such as apple 12, is depicted in FIG. 3 within narrow portion 34 of channel 32. It should be noted that elongated member 22 is also depicted in FIG. 3 as being rotated such that second cutting edge portion 20 moves toward and under first edge cutting portion 18. Either pulling frame member 16 with elongated member rotated or not rotated will sever stem 36 and the fruit connected thereto. Such fruit is intended to fall within a bag or basket 38 having mesh portions 40 and 42, FIG. 2. Bag 38 includes a pair of sheath portions 44 and 46 which extend over elongated member 16. Sheath 44 and 46 may be sewn to frame member 16 along a sew line 48 shown in FIG. 2 in conjunction with sheath 44. Plurality of loops 50 hold bag 38 to the heel portion 52 of frame member 16 FIGS. 2 and 3. Loop 51 partially encompasses shank 31 of pin 24, FIGS. 2 and 4.

Heel portion 52 of frame 16 is formed with a flange 54 of open configuration. Heel 52 includes a hollow butt 56 which accommodates a handle 58 which rotates or articulates relative to hollow butt 56. Thus, bolt fastener 60 may serve as a pivot for such articulation, FIGS. 1 and 3. Further, handle 58 may be constructed with an internal threaded portion 62 that engages an external threaded portion 64 of shaft 66. Shaft 66 extends from threaded portion 64 to a desired length depending on the type of harvesting for which device 10 is utilized.

Returning to FIG. 3, it may be observed that elongated member 22 includes a ring 68 and an S-hook 70 connected thereto. S-hook 70 also connects to a tab 72 encompasses a curved rod 74 which spans heel portion 52 of frame member 16, FIGS. 3 and 6. Spring means 76 in the form of a coil spring, wraps around curved rod 74 and lies between tab 72 and boss 78 of heel portion 52 of frame member 16.

A line 80, of flexible material, extends through an eye 82 lies within heel portion 52 of frame member 16. Line 80 connects to padeye 84 of tab 72. Thus, spring means 76 urges elongated member 22 and second cutting edge portion 20 away from first cutting edge portion 18.

In operation, the user maneuvers frame member 16 such that the narrow channel 32 engages the stem 36 of a fruit such as apple 12. At this juncture, the body of the fruit lies within the top portion of bag 38. The user of device 10 then pulls frame member 16 by use of handle 58 such that first and second cutting edge portions 18 and 20 sever stem 36, dropping fruit 12 into bag 38. If such cutting is not possible through this action, the user then pulls line 80 which in turn rotates tab 72 against the expanding action of spring means 76 along curved rod 74. S-hook connected to ring 68 of elongated member 22 follows the arcuate path shown by directional arrow 86. Elongated member is thus pulled along the arcuate path shown by directional arrow 86, FIG. 3, which in turn moves cutting edge 20 closer to cutting edge 18 to sever stem 36. It should be noted that line 80 passes through padeye 82 of heel portion 52 of frame member 16 when pulled or released. Releasing line 80 will permit spring means 76 to push elongated member 22 back to the position shown in solid line on FIG. 3 through the linkage afforded via tab 72 and S-hook 70.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A device for harvesting fruit attached to biological entity comprising:
   a. a frame member, said frame member including a first cutting edge portion, integrally formed with said frame member;
   b. a second cutting edge portion linked to said frame member and positioned immediately adjacent said first cutting edge portion said first and second cutting edge portions forming a converging channel for severing attachment of the fruit to the biological entity; and
   c. handle means connected to said frame member for permitting the user to grip said frame member; said channel positioned at said frame member opposite to said connection of said handle to said frame member.

2. The device of claim 1 in which said second cutting edge includes an elongated member and means for rotating said elongated member and second cutting edge toward said first cutting edge.

3. The device of claim 2, which additionally comprises a bag connected to said frame member said frame member forming the mouth of said bag.

4. The device of claim 3 in which said bag includes mesh portions.

5. The device of claim 2 which additionally comprises a line connected to said elongated member and means for directing said line to the vicinity of said handle.

6. The device of claim 5 which includes spring means for urging said second cutting edge away from said first cutting edge.

7. The device of claim 6 which additionally includes guide means for controlling rotation of said rotatable member.

8. The device of claim 7 in which said guide means includes a rod for controlling rotational movement of said elongated member against said urging of said spring means.

9. The device of claim 1 in which said handle articulates relative to said frame member.

10. A device for harvesting fruit attached to biological entity comprising:
  a. frame member, said frame member including a first cutting edge portion;
  b. a second cutting edge portion linked to said frame member and positioned adjacent said first cutting edge portion said first and second cutting edge portions forming a converging channel for severing attachment of the fruit to the biological entity;
  c. handle means connected to said frame member for permitting the user to grip said frame member; said channel positioned at said frame member opposite to said connection of said handle to said frame member;
  d. a bag connected to said frame member, said frame member forming the mouth of said bag; and
  e. a flange angularly extending from said frame member in a direction opposite to said bag.

11. A device for harvesting fruit attached to biological entity comprising:
  a. frame member, said frame member including a first cutting edge portion;
  b. a second cutting edge portion linked to said frame member and positioned adjacent said first cutting edge portion said first and second cutting edge portions forming a converging channel for severing attachment of the fruit to the biological entity; said second cutting edge including an elongated member and means for rotating said elongated member and second cutting edge toward said first cutting edge;
  c. handle means connected to said frame member for permitting the user to grip said frame member; said channel positioned at said frame member opposite to said connection of said handle to said frame member;
  d. a line connected to said elongated member and means for directing said line to the vicinity of said handle;
  e. spring means for urging said second cutting edge away from said first cutting edge;
  f. guide means for controlling rotation of said rotatable member, said guide means including a rod for controlling rotational movement of said elongated member against said urging of said spring means; said spring means surrounding said rod, said elongated member including a portion encompassing said rod, and said spring means bearing on said rod encompassing portion of said elongated member.

* * * * *